United States Patent
Zhu et al.

(10) Patent No.: US 12,513,752 B2
(45) Date of Patent: Dec. 30, 2025

(54) TWO-STEP RANDOM ACCESS CHANNEL SIGNALING

(71) Applicant: QUALCOMM Incorporated, San Diego, CA (US)

(72) Inventors: Xipeng Zhu, San Diego, CA (US); Huichun Liu, San Diego, CA (US); Ruiming Zheng, Beijing (CN); Peng Cheng, Beijing (CN); Gavin Bernard Horn, La Jolla, CA (US)

(*) Notice: Subject to any disclaimer, the term of this patent is extended or adjusted under 35 U.S.C. 154(b) by 19 days.

(21) Appl. No.: 17/804,733

(22) Filed: May 31, 2022

(65) Prior Publication Data

US 2022/0330329 A1    Oct. 13, 2022

Related U.S. Application Data

(63) Continuation of application No. 17/753,851, filed as application No. PCT/CN2020/119878 on Oct. 8, 2020.

(51) Int. Cl.
*H04W 74/0833* (2024.01)
*H04B 7/0408* (2017.01)
(Continued)

(52) U.S. Cl.
CPC ........ *H04W 74/085* (2013.01); *H04B 7/0408* (2013.01); *H04W 72/1263* (2013.01);
(Continued)

(58) Field of Classification Search
CPC ........... H04W 74/085; H04W 72/1263; H04W 74/0866; H04W 74/0833; H04W 74/002;
(Continued)

(56) References Cited

U.S. PATENT DOCUMENTS

2013/0039274 A1\*   2/2013   Lee .................. H04W 74/0833
                                                          370/328
2018/0110074 A1    4/2018   Akkarakaran et al.
(Continued)

FOREIGN PATENT DOCUMENTS

KR      20180082675 A    7/2018
WO      2020068596 A1    4/2020
(Continued)

OTHER PUBLICATIONS

Ericsson, "Details of RACH Report Content in NR," 3GPP TSG RAN WG2 #107, R2-1910842, Prague, CZ, Aug. 26-30, 2019, pp. 1-6 (Year: 2019).\*

(Continued)

*Primary Examiner* — Yu-Wen Chang

(57) ABSTRACT

Various aspects of the present disclosure generally relate to wireless communication. In some aspects, a user equipment (UE) may generate a report for one or more two-step random access channel (RACH) procedures between the UE and a base station (BS), wherein the RACH report includes at least one of an indication of a quantity of message A (MsgA) payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold. The UE may transmit the report to the BS. Numerous other aspects are provided.

30 Claims, 8 Drawing Sheets

(51) Int. Cl.
  *H04W 72/1263*  (2023.01)
  *H04W 74/00*   (2009.01)
  *H04W 74/08*   (2009.01)
  *H04W 74/0836* (2024.01)

(52) U.S. Cl.
  CPC ..... *H04W 74/002* (2013.01); *H04W 74/0833* (2013.01); *H04W 74/0836* (2024.01); *H04W 74/0866* (2013.01)

(58) Field of Classification Search
  CPC .......... H04W 74/0836; H04W 74/0838; H04B 7/0408
  See application file for complete search history.

(56) References Cited

U.S. PATENT DOCUMENTS

| | | |
|---|---|---|
| 2018/0139787 A1 | 5/2018 | Islam et al. |
| 2018/0324863 A1 | 11/2018 | Akoum et al. |
| 2019/0069258 A1* | 2/2019 | Jeon ............... H04B 7/0695 |
| 2019/0075599 A1 | 3/2019 | Xia et al. |
| 2019/0110300 A1 | 4/2019 | Chen et al. |
| 2019/0261411 A1 | 8/2019 | Chin et al. |
| 2019/0387541 A1* | 12/2019 | Agiwal ............... H04W 74/006 |
| 2020/0008245 A1 | 1/2020 | Yan et al. |
| 2020/0100297 A1 | 3/2020 | Agiwal et al. |
| 2020/0260341 A1 | 8/2020 | Jang et al. |
| 2020/0344812 A1* | 10/2020 | Agiwal ............... H04W 72/042 |
| 2020/0351955 A1* | 11/2020 | Jeon ............... H04L 1/1642 |
| 2020/0374926 A1* | 11/2020 | Shah ............... H04W 52/325 |
| 2020/0413450 A1* | 12/2020 | Kim ............... H04W 36/08 |
| 2021/0051707 A1* | 2/2021 | Rastegardoost ...... H04L 5/0051 |
| 2021/0100034 A1* | 4/2021 | Turtinen ............... H04B 17/318 |
| 2021/0100039 A1 | 4/2021 | Zhang et al. |
| 2021/0329703 A1 | 10/2021 | Yang et al. |
| 2021/0345416 A1 | 11/2021 | Hu et al. |
| 2022/0022267 A1* | 1/2022 | Shi ............... H04W 74/0866 |
| 2022/0070938 A1 | 3/2022 | Wu et al. |
| 2022/0124814 A1* | 4/2022 | Uchino ............... H04W 74/004 |
| 2022/0124816 A1 | 4/2022 | Farag et al. |
| 2022/0191961 A1* | 6/2022 | Qiu ............... H04W 76/20 |
| 2022/0217781 A1* | 7/2022 | Decarreau .......... H04W 74/004 |
| 2022/0217788 A1 | 7/2022 | Ohara et al. |
| 2022/0256610 A1* | 8/2022 | Lin ............... H04W 74/0833 |
| 2022/0287107 A1* | 9/2022 | Kim ............... H04W 72/0446 |
| 2022/0295571 A1* | 9/2022 | Da Silva ............... H04W 76/16 |
| 2022/0353904 A1 | 11/2022 | Zhu et al. |
| 2025/0063605 A1 | 2/2025 | Bao et al. |

FOREIGN PATENT DOCUMENTS

| | | | |
|---|---|---|---|
| WO | 2020198924 A1 | 10/2020 | |
| WO | WO-2021050045 A1 * | 3/2021 | ........ H04W 74/0833 |
| WO | WO-2021066703 A1 * | 4/2021 | |

OTHER PUBLICATIONS

CMCC, "Text proposals for RACH optimization," 3GPP TSG-RAN WG3 #104, R3-193187, Reno, USA, May 13-17, 2019, pp. 1-3 (Year: 2019).*
International Search Report and Written Opinion—PCT/CN2019/110057—ISA/EPO—Jul. 7, 2020.
International Search Report and Written Opinion—PCT/CN2020/119878—ISA/EPO—Dec. 30, 2020.
LG Electronics: "Discussion on 2-step RACH Procedure", 3GPP TSG RAN WG1 Meeting #98bis, R1-1910575, Oct. 5, 2019 (Oct. 5, 2019) pp. 1-24.
Qualcomm: "Revised WID: Integrated Access and Backhaul for NR", 3GPP TSG RAN meeting #83, RP-190712, Mar. 21, 2019 (Mar. 21, 2019), 7 pages.
Qualcomm Incorporated: "Procedures for Two-Step RACH", 3GPP TSG-RAN WG1 Meeting #97, R1-1907256, 3GPP Draft, R1-1907256 Procedures for Two-Step Rach, 3rd Generation Partnership Project(3GPP), Mobile Competence Centre, 650, Route Des Lucioles, F-06921 Sophia-AntipolisCedex, France, vol. RAN WG1, May 13, 2019-May 17, 2019, Reno, USA, May 17, 2019 (May 17, 2019), pp. 1-13, XP051728696, Retrieved from the Internet: URL: http://www.3gpp.org/ftp/Meetings%5F3GPP%5FSYNC/RAN1/Docs/R1%2D1907256%2Ezip, [retrieved on May 13, 2019], Section 2, The Whole Document.
ZTE: "Summary of 7.2.1.2 Procedure for Two-step RACH", 3GPP TSG RAN WG1 #96, R1-1903436, Athens, Greece, Feb. 25- Mar. 1, 2019, Mar. 3, 2019 (Mar. 3, 2019), Retrieved from the Internet: URL: http://www.3gpp.org/ftp/tsg%5Fran/WG1%5FRL1/TSGR1%5F96/Docs/R1%2D1903436%2Ezip, [retrieved on Mar. 3, 2019], 12 pages, sections 1-3, the Section 2.3.
Nokia, et al., "Feature Lead Summary#3 on 2 Step RACK Procedures", 3GPP TSG RAN WG1 #97, R1-1907900, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 20, 2019, 59 Pages, XP051740159, pp. 1-2, pp. 13-16, pp. 32,34-35, pp. 46,55-57.
Supplementary European Search Report—EP20875194—Search Authority—The Hague—Sep. 7, 2023.

* cited by examiner

TWO-STEP RANDOM ACCESS CHANNEL SIGNALING

CROSS-REFERENCE TO RELATED APPLICATIONS

This application is a continuation of U.S. patent application Ser. No. 17/753,851, filed on Mar. 16, 2022, entitled "TWO-STEP RANDOM ACCESS CHANNEL SIGNALING," which is a 371 national stage of PCT Application No. PCT/CN2020/119878, filed on Oct. 8, 2020, entitled "TWO-STEP RANDOM ACCESS CHANNEL SIGNALING," which claims priority to International Patent Application No. PCT/CN2019/110057, filed on Oct. 9, 2019, entitled "TWO-STEP RANDOM ACCESS CHANNEL SIGNALING," which are incorporated herein by reference in their entireties.

FIELD OF THE DISCLOSURE

Aspects of the present disclosure generally relate to wireless communication and to techniques and apparatuses for two-step random access channel signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include generating a report for one or more two-step random access channel (RACH) procedures between the UE and a base station (BS), wherein the RACH report includes at least one of: an indication of a quantity of message A (MsgA) payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold; and transmitting the report to the BS.

In some aspects, a method of wireless communication, performed by a first BS, may include generating a RACH configuration that identifies at least one of: a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window; and transmitting the RACH configuration to a second BS.

In some aspects, a UE for wireless communication may include memory and one or more processors operatively coupled to the memory. The memory and the one or more processors may be configured to generate a report for one or more two-step RACH procedures between the UE and a BS, wherein the RACH report includes at least one of: an indication of a quantity of MsgA payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold; and transmit the report to the BS.

In some aspects, a first BS for wireless communication may include memory and one or more processors operatively coupled to the memory. The memory and the one or more processors may be configured to generate a RACH configuration that identifies at least one of: a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window; and transmit the RACH configuration to a second BS.

In some aspects, a non-transitory computer-readable medium may store one or more instructions for wireless communication. The one or more instructions, when executed by one or more processors of a UE, may cause the one or more processors to generate a report for one or more two-step RACH procedures between the UE and a BS, wherein the RACH report includes at least one of: an indication of a quantity of MsgA payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold; and transmit the report to the BS.

In some aspects, a non-transitory computer-readable medium may store one or more instructions for wireless communication. The one or more instructions, when executed by one or more processors of a first BS, may cause the one or more processors to generate a RACH configuration that identifies at least one of: a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window; and transmit the RACH configuration to a second BS.

In some aspects, an apparatus for wireless communication may include means for generating a report for one or more two-step RACH procedures between the apparatus and a BS, wherein the RACH report includes at least one of: an indication of a quantity of MsgA payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold; and means for transmitting the report to the BS.

In some aspects, a first apparatus for wireless communication may include means for generating a RACH configuration that identifies at least one of: a parameter for selecting a two-step RACH procedure or a four-step RACH procedure, a RACH occasion configuration for the two-step RACH procedure and the four-step RACH procedure, a mapping configuration for a message A (MsgA) preamble and a MsgA payload, a PUSCH configuration, a MsgA retransmission configuration, or a MsgB receiving window; and means for transmitting the RACH configuration to a second apparatus.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
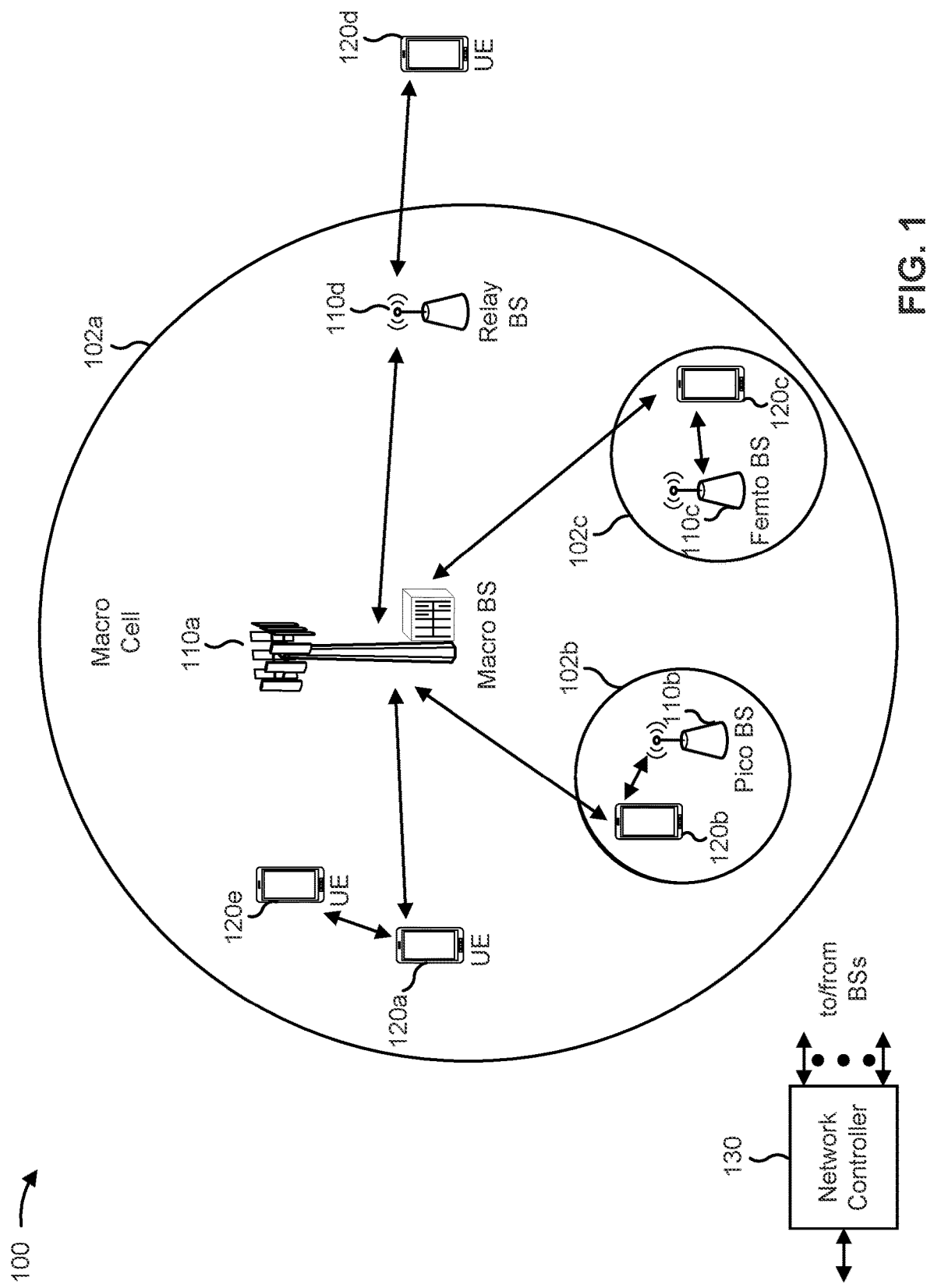
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
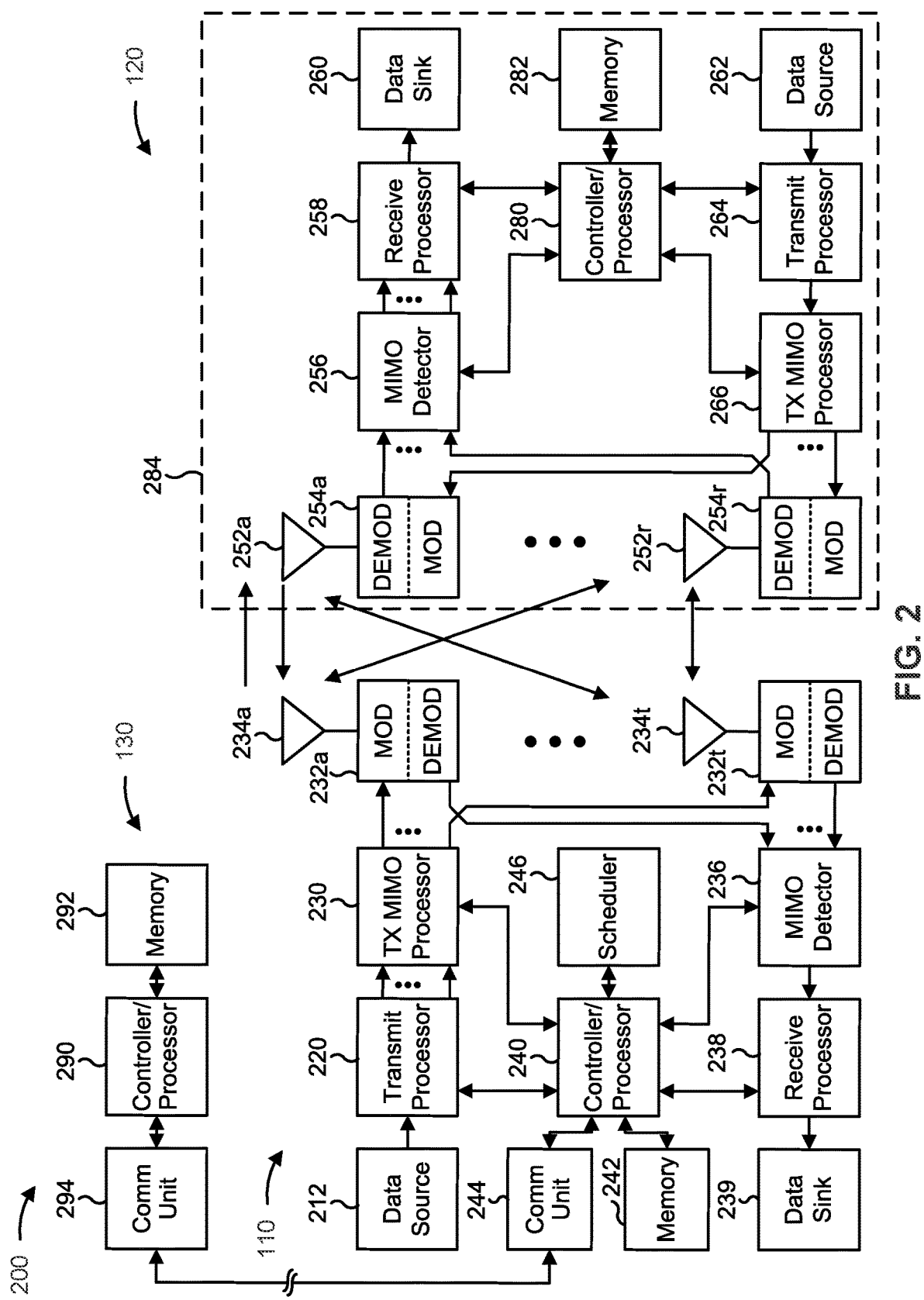
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with two-step random access channel signaling, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for generating a report for one or more two-step random access channel (RACH) procedures between the UE 120 and a BS 110, wherein the RACH report includes at least one of an indication of a quantity of message A (MsgA) payloads transmitted during the one or more two-step RACH procedures on each beam of one or more beams associated with the BS 110, an indication of one or more parameters associated with each MsgA communication transmitted during the one or more two-step RACH procedures, or an indication of whether a respective signal strength for each beam, associated with the one or more two-step RACH procedures, satisfies a signal strength threshold, means for transmitting the report to the BS 110, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for generating a RACH configuration that identifies at least one of a parameter for selecting a two-step RACH procedure or a four-step RACH procedure, a RACH occasion configuration for the two-step RACH procedure and the four-step RACH procedure, a mapping configuration for a MsgA preamble and a MsgA payload, a physical uplink shared channel (PUSCH) configuration, a MsgA retransmission configuration, or a message B (MsgB) receiving window, means for transmitting the RACH configuration to another BS 110 and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), a primary broadcast channel (PBCH), and/or the like. The UE may use the PSS to determine symbol timing in the downlink direction, and may use the SSS to determine a physical cell identifier associated with the BS, and may use the PBCH to determine the frame timing.

To synchronize the connection in the uplink direction, the UE and the BS may perform a random access channel (RACH) procedure. In some aspects, the UE and the BS may perform a four-step RACH procedure. In a four-step RACH procedure, the UE and the BS may exchange four primary RACH communications. The UE may transmit a Message 1 (Msg1) communication to the BS (e.g., as defined in a 3GPP four-step RACH procedure). The Msg1 communication may be a RACH preamble communication that is transmitted in a RACH occasion (e.g., a particular set of time-frequency resources), the combination of which may be referred to as a RACH signature. The BS may respond to the Msg1 communication with a Message 2 (Msg2) communication (e.g., as defined in a 3GPP four-step RACH procedure), which may be a random access response (RAR) communication. The UE may respond to the Msg2 communication with a Message 3 (Msg3) communication (e.g., as defined in a 3GPP four-step RACH procedure), which may be a radio resource control (RRC) connection request communication. The BS may respond to the Msg3 communication with a Message 4 (Msg4) communication (e.g., as defined in a 3GPP four-step RACH procedure), which may be a medium access control (MAC) control element (MAC-CE) contention resolution identifier communication and may include an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the Msg1 communication and the Msg3 communication into a communication referred to as a MsgA communication (e.g., as defined in a 3GPP two-step RACH procedure). The Msg1 portion of the MsgA communication may be referred to as the preamble portion of the MsgA communication. The Msg3 portion of the MsgA communication may be referred to as the payload portion of the MsgA communication. The UE may transmit the Msg1 portion and the Msg3 portion sequentially and prior to receiving the Msg2 communication and the Msg4 communication. The BS may receive the MsgA communication and may transmit a MsgB communication (e.g., as defined in a 3GPP four-step RACH procedure), which may include the Msg2 communication and the Msg4 communication.

Some aspects, described herein, provide techniques and apparatuses for two-step RACH signaling. In some aspects, the UE may transmit a RACH report to a BS. The RACH report may include various parameters that are based at least in part on one or more two-step RACH procedures between by the UE and the BS, and may include, for example, an indication of a quantity of MsgA payloads transmitted by the UE during the one or more two-step RACH procedures on each beam of one or more beams associated with the BS, an indication of one or more parameters associated with each MsgA communication transmitted during the one or more two-step RACH procedures, an indication of whether a respective signal strength for each beam, associated with the one or more two-step RACH procedures, satisfies a signal strength threshold, and/or the like.

The BS may generate an optimized RACH configuration based at least in part on the parameters included in the RACH report. For example, the RACH configuration may identify a parameter for selecting a two-step RACH procedure or a four-step RACH procedure, a RACH occasion configuration for two-step RACH procedures and four-step RACH procedures, a mapping configuration for a MsgA preamble and a MsgA payload, a PUSCH configuration for various types of RACH procedures, a MsgA retransmission configuration for two-step RACH procedures, a MsgB receiving window, and/or the like. In this way, the RACH configuration may configure efficient operation of subsequent two-step RACH procedures for the UE and other UEs. For example, the RACH configuration may reduce access delays for UEs covered by particular SSBs, may reduce delays in requesting other types of system information, may reduce imbalance of access delays on uplink and supplementary uplink channels, may minimize beam failure recovery delays for UEs in RRC connected mode, may reduce the quantity of failed RACH attempts, and/or the like. Moreover, the BS may transmit the RACH configuration to other BSs, which permits the other BSs to uses the optimized RACH configuration.

Figure 3:
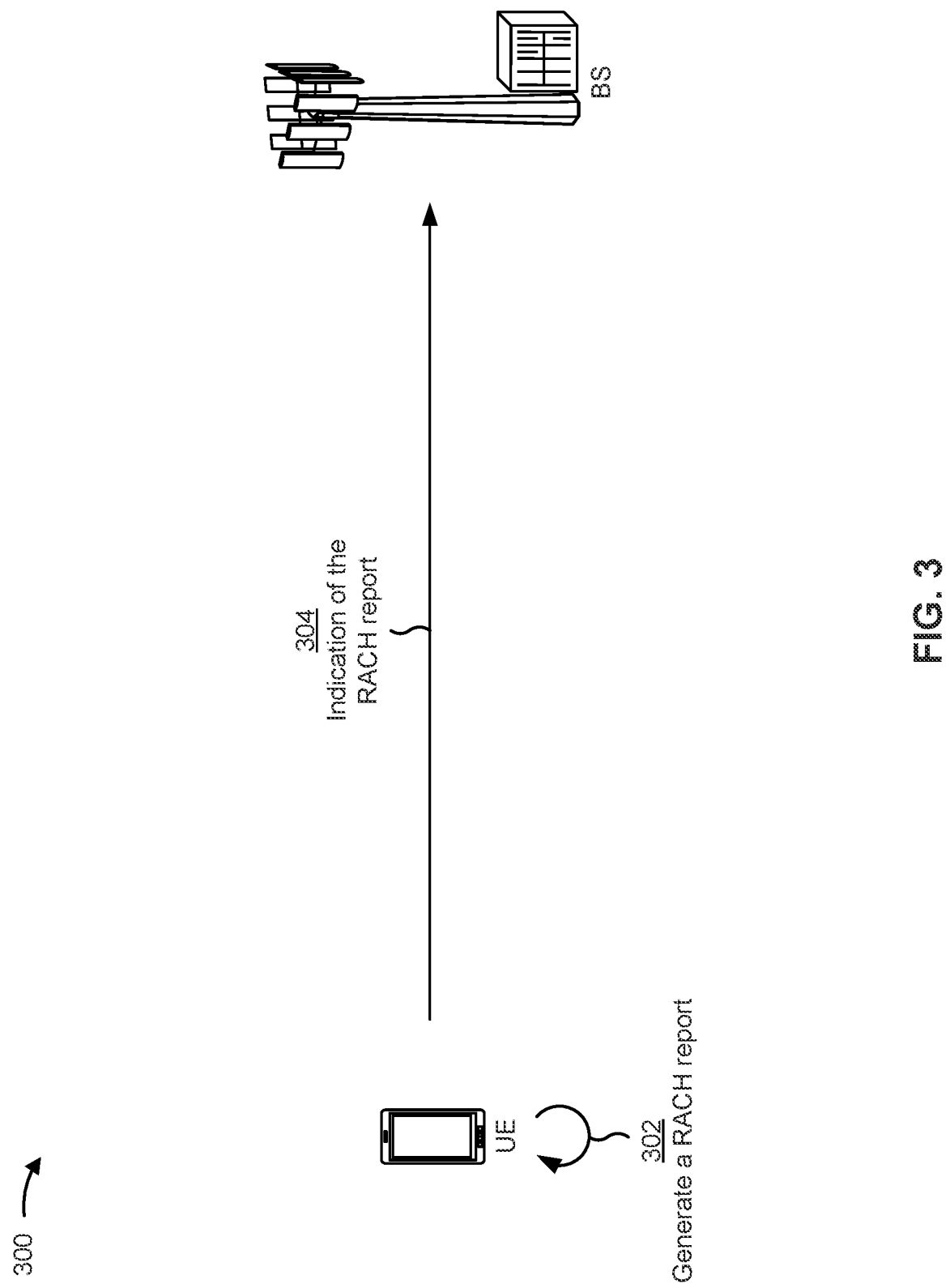
FIGS. 3 and 4 are diagrams illustrating one or more examples of two-step random access channel signaling, in accordance with various aspects of the present disclosure.

FIG. 3 is a diagram illustrating one or more examples 300 of two-step random access channel signaling, in accordance with various aspects of the present disclosure. As shown in FIG. 3, example(s) 300 may include communication between a UE (e.g., UE 120) and a BS (e.g., BS 110). In some aspects, the UE and the BS may be included in a wireless network, such as wireless network 100 and/or another wireless network, and may communicate via an access link (e.g., which may include an uplink and a downlink). In some aspects, the UE may initiate and perform one or more RACH procedures with the BS (e.g., one or more four-step RACH procedures, one or more two-step RACH procedures, and/or the like) to communicatively connected with the BS.

As shown in FIG. 3, and by reference number 302, the UE may generate a RACH report for the one or more RACH procedures performed between the UE and the BS. The RACH report may include various parameters associated with the one or more two-step RACH procedures, the one or more four-step RACH procedures, and/or the like.

In some aspects, the various parameters in the RACH report may include an indication of a quantity of MsgA payloads transmitted during the one or more two-step RACH procedures on each beam of one or more beams associated with the BS. For example, the RACH report may include an indication of the quantity of MsgA payloads transmitted during each two-step RACH procedure on each beam of one or more beams associated with the BS (e.g., a quantity of MsgA payloads transmitted on a first beam during a two-step RACH procedure, a quantity of MsgA payloads transmitted on a second beam during a two-step RACH procedure, and so on). As another example, the RACH report may include an indication of the quantity of MsgA payloads transmitted across all two-step RACH procedures on each beam of one or more beams associated with the BS.

In some aspects, each beam of the one or more beams may be identified in the RACH report by an associated SSB identifier. In this case, the quantity of MsgA payloads transmitted on a particular beam may be indicated in the RACH report by the SSB identifier associated with the beam. In some aspects, the quantity of MsgA payloads transmitted on a particular beam may be indicated in the RACH report by a combination of a quantity of MsgA communications transmitted on the beam and a quantity of Msg3 fallback communications transmitted on the beam. In some aspects, the quantity of MsgA communications transmitted on the beam may be indicated in a numberOfPreamblesSent information element in the RACH report.

In some aspects, the various parameters in the RACH report may include an indication of one or more parameters associated with each MsgA communication transmitted during each of the one or more two-step RACH procedures. The one or more parameters associated with each MsgA communication transmitted during each of the one or more two-step RACH procedures may include, for example, a payload side of each MsgA communication, an outcome of each MsgA communication, a PUSCH beam on which each MsgA communication was transmitted, and/or the like.

In some aspects, the outcome of a MsgA communication may indicate whether the transmission of the MsgA communication was successful (e.g., the BS received the MsgA communication and transmitted a MsgB communication in response), whether the transmission of the MsgA communication failed and resulted in a fallback to a Msg1 communication and/or a Msg3 communication transmission, or whether the UE received an indication of a back-off from the BS based at least in part on the transmission of the MsgA communication. The indication of the back-off may be an indication to retransmit the MsgA communication to the BS at a later time, in which case the RACH report may indicate the back-off time duration specified by the BS.

In some aspects, the various parameters in the RACH report may include an indication of whether a respective signal strength for each beam, associated with each of the one or more two-step RACH procedures, satisfies a signal strength threshold. For example, the RACH report may identify the SSB identifier associated with a beam on which the UE performed a two-step RACH procedure with the BS, and may identify whether the signal strength determined by the UE satisfies the signal strength threshold. The RACH report may identify whether the signal strength for each two-step RACH procedure performed on the beam satisfies the signal strength threshold. The signal strength threshold may be an RSRP threshold, an RSRQ threshold, an RSSI threshold, a signal to interference plus noise ratio (SINR) threshold, and/or the like.

In some aspects, the UE may further include an indication of the measured signal strength for each beam on which the UE performed a two-step RACH procedure with the BS. The signal strength for each beam may be indicated by an RSRP measurement, an RSSI measurement, an RSRQ measurement, an SINR measurement, and/or the like. In some aspects, the UE may include an indication of the signal strength for each two-step RACH procedure performed on the beam.

In some aspects, the UE may generate the RACH report to include any quantity and/or combination of the parameters described above and/or other parameters.

As further shown in FIG. 3, and by reference number 304, the UE may transmit the RACH report to the BS. In some aspects, the UE may transmit the RACH report to the BS based at least in part on completing a RACH procedure with the BS and establishing a connection with the BS. In some aspects, the UE may transmit the RACH report in a physical uplink control channel (PUCCH) communication, in a PUSCH communication, and/or the like.

In this way, the UE may transmit a RACH report to a BS. The RACH report may include various parameters that are based at least in part on one or more two-step RACH procedures between by the UE and the BS, and may include, for example, an indication of a quantity of MsgA payloads transmitted by the UE during the one or more two-step RACH procedures on each beam of one or more beams associated with the BS, an indication of one or more parameters associated with each MsgA communication transmitted during the one or more two-step RACH procedures, an indication of whether a respective signal strength for each beam, associated with the one or more two-step RACH procedures, satisfies a signal strength threshold, and/or the like. The RACH report may permit the BS to generate an optimized RACH configuration based at least in part on the parameters included in the RACH report.

As indicated above, FIG. 3 is provided as one or more examples. Other examples may differ from what is described with respect to FIG. 3. For example, in some aspects, the UE may include one or more of the parameters associated with the one or more RACH procedures between the UE and the BS in a radio link failure (RLF) report, a connection establishment failure (CEF) report, an accessibility report, and/or the like.

In the case of transmitting a radio link failure report to the BS, the UE may transmit the radio link failure report based at least in part on detecting a radio link failure associated with the access link between the UE and the BS, based at least in part on detecting a handover failure (e.g., a failure in a handover of the UE to the BS), and/or the like.

In the case of transmitting a connection establishment failure report or an accessibility report to the BS, the UE may indicate to the BS of the availability of the connection establishment failure report or the accessibility report (e.g., by transmitting a connEstFailInfoAvailable information element to the BS). The UE may transmit the connection establishment failure report or the accessibility report based at least in part on failing to transmit an RRCSetupRequest communication to the BS, based at least in part on failing to transmit an RRCResumeRequest to the BS, and/or the like.

Figure 4:
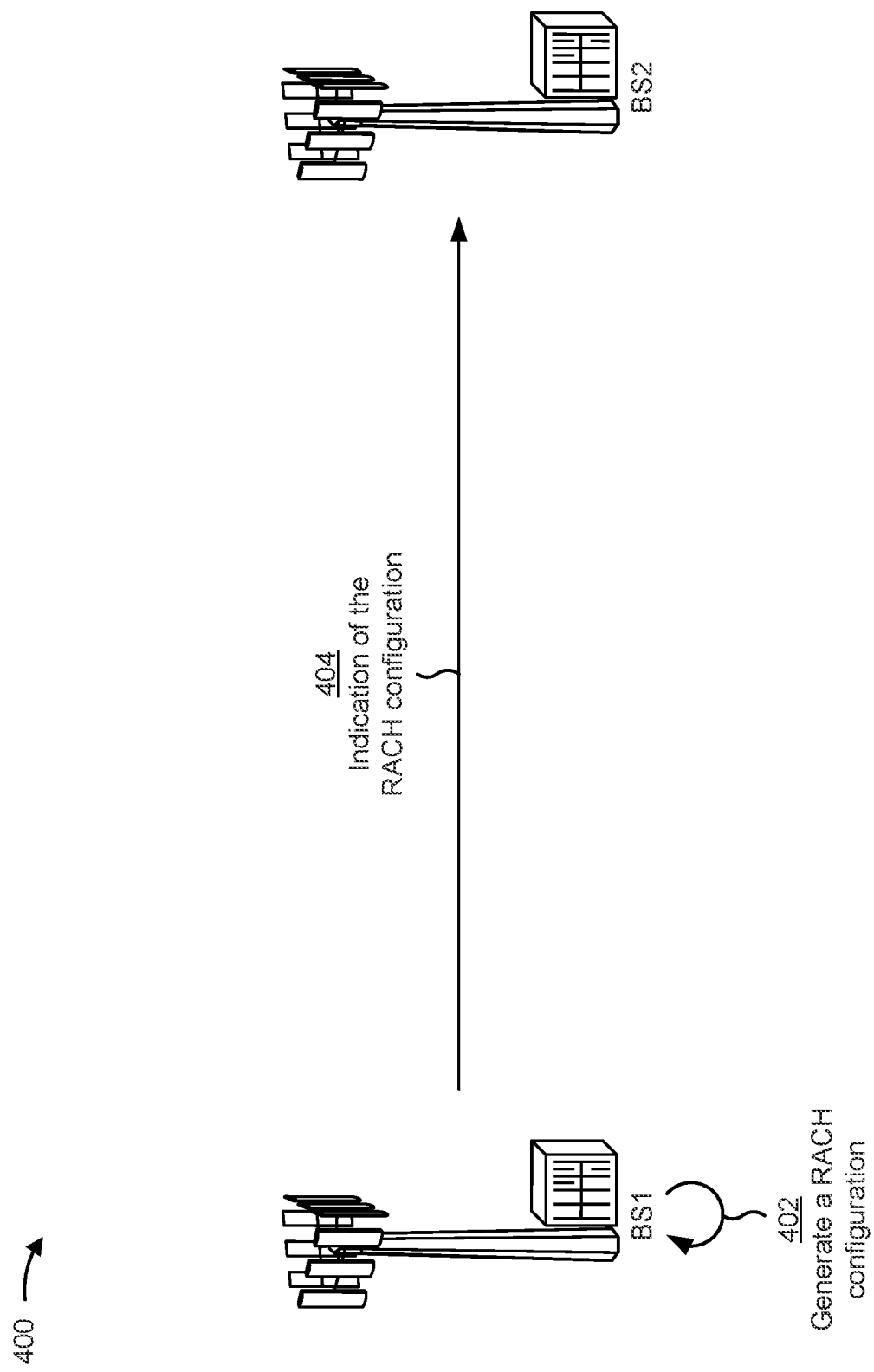

FIG. 4 is a diagram illustrating one or more examples 400 of two-step random access channel signaling, in accordance with various aspects of the present disclosure. As shown in FIG. 4, example(s) 400 may include communication between a plurality of BSs (e.g., BSs 110), such as BS1, BS2, and/or the like. In some aspects, example(s) 400 may include a greater quantity of BSs. In some aspects, BS1 and BS2 may be included in a wireless network, such as wireless network 100 and/or another wireless network, and may communicate via a backhaul (e.g., Xn backhaul interface, an F1 backhaul interface, and/or the like).

As shown in FIG. 4, and by reference number 402, B S may generate a RACH configuration for one or more RACH procedures performed between BS1 and one or more UEs (e.g., UEs 120), such as one or more two-step RACH procedures, one or more four-step RACH procedures, and/or the like. In some aspects, the RACH configuration may include various parameters configured based at least in part on one or more RACH reports received from the one or more UEs, based at least in part on information received from other BSs (e.g., BS2), and/or the like.

In some aspects, the various parameters identified in the RACH configuration may include a parameter for selecting a two-step RACH procedure or a four-step RACH procedure. In some aspects, the parameter for selecting a two-step RACH procedure or a four-step RACH procedure may identify a system information block that is configured to include information that identifies whether the two-step RACH procedure or the four-step RACH procedure is to be selected.

In some aspects, the parameter for selecting a two-step RACH procedure or a four-step RACH procedure may identify a threshold for determining whether to perform a two-step RACH procedure with BS1 or a four-step RACH procedure. In some aspects, the threshold may include a beam signal strength threshold for selecting the two-step RACH procedure or the four-step RACH procedure. In this case, a UE may determine whether to select and perform a two-step RACH procedure or a four-step RACH procedure based at least in part on whether a signal strength, measured on a beam on which the RACH procedure is to be performed, satisfies the beam signal strength threshold. For example, the RACH configuration may indicate that a two-step RACH procedure is to be selected if the beam signal strength threshold is satisfied, and that a four-step RACH procedure is to be selected if the beam signal strength threshold is not satisfied.

In some aspects, the various parameters identified in the RACH configuration may include a RACH occasion configuration for the two-step RACH procedure and the four-step RACH procedure. The RACH occasion configuration may identify the RACH occasions, associated with a particular beam of BS1, that are permitted to be used for two-step RACH procedures, and may identify the RACH occasions, associated with the beam, that are permitted to be used for four-step RACH procedures.

In some aspects, the various parameters identified in the RACH configuration may include a mapping configuration for a MsgA preamble and a MsgA payload. In some aspects, the mapping configuration for may indicate that a MsgA preamble and a MsgA payload of a MsgA communication are to be time division multiplexed and/or frequency division multiplexed. In some aspects, the mapping configuration for the MsgA preamble and the MsgA payload may identify a time division multiplexing mapping for the MsgA preamble and the MsgA payload if the MsgA preamble and the MsgA payload are to be time division multiplexed. In some aspects, the mapping configuration for the MsgA preamble and the MsgA payload may identify a frequency division multiplexing mapping for the MsgA preamble and the MsgA payload if the MsgA preamble and the MsgA payload are to be frequency division multiplexed.

In some aspects, if the MsgA preamble and the MsgA payload are to be time division multiplexed, the mapping configuration for the MsgA preamble and the MsgA payload may identify a time gap between the MsgA preamble and the MsgA payload. In some aspects, the mapping configuration for the MsgA preamble and the MsgA payload may identify a PUSCH resource unit (PRU) for the MsgA preamble, may identify a quantity of PRUs for the MsgA preamble, and/or the like.

In some aspects, the various parameters identified in the RACH configuration may include a PUSCH configuration for performing a RACH procedure (e.g., a two-step RACH procedure, a four-step RACH procedure, and/or the like). In some aspects, the PUSCH configuration may include a PUSCH modulation coding scheme that is to be used for MsgA communications transmitted as part of a RACH procedure, a PUSCH transport block size that is to be used for MsgA communications transmitted as part of a RACH procedure, a PUSCH time-frequency configuration that is to be used for MsgA communications transmitted as part of a RACH procedure, a PUSCH beam configuration that is to be used for MsgA communications transmitted as part of a RACH procedure, a PUSCH demodulation reference signal (DMRS) sequence that is to be used for MsgA communications transmitted as part of a RACH procedure, a PUSCH DMRS port that is to be used for MsgA communications transmitted as part of a RACH procedure, and/or the like.

In some aspects, the various parameters identified in the RACH configuration may include a MsgA retransmission configuration. In some aspects, the MsgA retransmission configuration may indicate a MsgA retransmission timer (e.g., a time duration between transmitting a MsgA communication and performing a retransmission of the MsgA communication). In some aspects, the MsgA retransmission configuration may indicate a threshold quantity of MsgA retransmission attempts that are permitted during RACH procedures with BS1.

In some aspects, the various parameters identified in the RACH configuration may include a MsgB receiving window. The MsgB receiving window may identify a location in the time domain, and a time duration, during which BS1 is to transmit a MsgB communication to a UE. The location in the time domain of the MsgB receiving window may be based at least in part on a timing of a MsgA communication transmission. In this case, the RACH configuration may identify a timing offset between reception of the MsgA communication and transmission of the MsgB communication.

In some aspects, BS1 may generate the RACH configuration to include any quantity and/or combination of the parameters described above and/or other parameters.

As further shown in FIG. 4, and by reference number 404, BS1 may transmit the RACH configuration to BS2 and/or other BSs. In some aspects, BS1 may transmit the RACH configuration based at least in part on generating the RACH configuration, may transmit the RACH configuration at a particular time interval, and/or the like. In some aspects, BS1 may transmit the RACH configuration to BS2 and/or the other BSs via an Xn backhaul interface, an F1 backhaul interface, and/or the like.

In this way, BS1 may generate a RACH configuration (e.g., based at least in part on the parameters included in one or more RACH reports received from one or more UEs). The RACH configuration may identify a parameter for selecting a two-step RACH procedure or a four-step RACH procedure, a RACH occasion configuration for two-step RACH procedures and four-step RACH procedures, a mapping configuration for a MsgA preamble and a MsgA payload, a PUSCH configuration for various types of RACH procedures, a MsgA retransmission configuration for two-step RACH procedures, a MsgB receiving window, and/or the like. In this way, the RACH configuration may configure efficient operation of subsequent two-step RACH procedures. For example, the RACH configuration may reduce access delays for UEs covered by particular SSBs, may reduce delays in requesting other types of system information, may reduce imbalance of access delays on uplink and supplementary uplink channels, may minimize beam failure recovery delays for UEs in RRC connected mode, may reduce the quantity of failed RACH attempts, and/or the like. Moreover, BS1 may transmit the RACH configuration to other BSs (e.g., BS2), which permits the other BSs to uses the optimized RACH configuration.

As indicated above, FIG. 4 is provided as one or more examples. Other examples may differ from what is described with respect to FIG. 4.

Figure 5:
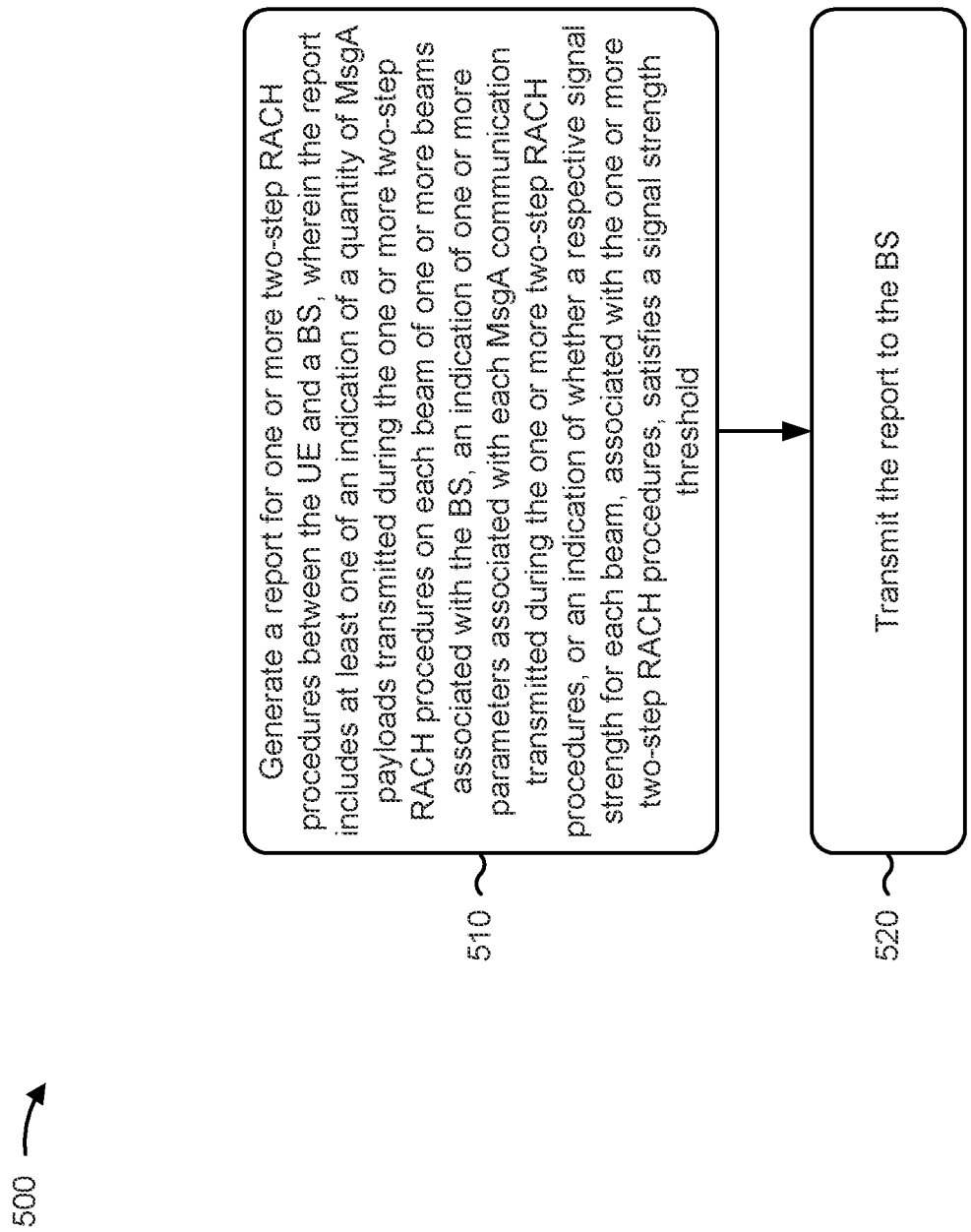
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., 120) performs operations associated with two-step RACH signaling.

As shown in FIG. 5, in some aspects, process 500 may include generating a report for one or more two-step RACH procedures between the UE and a BS, wherein the RACH report includes at least one of an indication of a quantity of MsgA payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold (block 510). For example, the UE (e.g., using receive processor 258, transmit processor 264, controller/processor 280, memory 282, and/or the like) may generate a report for one or more two-step RACH procedures between the UE and a BS, as described above. In some aspects, the RACH report includes at least one of an indication of a quantity of MsgA payloads transmitted during the one or more two-step RACH procedures on each beam of one or more beams associated with the BS, an indication of one or more parameters associated with each MsgA communication transmitted during the one or more two-step RACH procedures, or an indication of whether a respective signal strength for each beam, associated with the one or more two-step RACH procedures, satisfies a signal strength threshold.

As further shown in FIG. 5, in some aspects, process 500 may include transmitting the report to the BS (block 520). For example, the UE (e.g., using receive processor 258, transmit processor 264, controller/processor 280, memory 282, and/or the like) may transmit the report to the BS, as described above.

Process 500 may include additional aspects, such as any single aspect or any combination of aspects described below and/or in connection with one or more other processes described elsewhere herein.

In a first aspect, the indication of the quantity of MsgA payloads comprises an indication of a quantity of MsgA communications transmitted during the one or more two-step RACH procedures on each beam of the one or more beams associated with the BS and an indication of a quantity of Msg3 fallback communications transmitted during the one or more two-step RACH procedures on each beam of the one or more beams associated with the BS. In a second aspect, alone or in combination with the first aspect, indication of the quantity of MsgA communications is included in a numberOfPreamblesSent information element.

In a third aspect, alone or in combination with one or more of the first and second aspects, the one or more parameters comprise at least one of a payload size, a MsgA communication outcome, or a physical uplink shared channel beam. In a fourth aspect, alone or in combination with one or more of the first through third aspects, the MsgA communication outcome comprises a successful MsgA communication transmission, a fallback to a Msg3 communication, or an indication of a back-off for a back-off time duration.

In a fifth aspect, alone or in combination with one or more of the first through fourth aspects, generating the report for one or more two-step RACH procedures between the UE and the BS comprises generating the report for a plurality of two-step RACH procedures between the UE and the BS. In a sixth aspect, alone or in combination with one or more of the first through fifth aspects, the report comprises a RACH report, a radio link failure report, or a connection establishment failure report.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
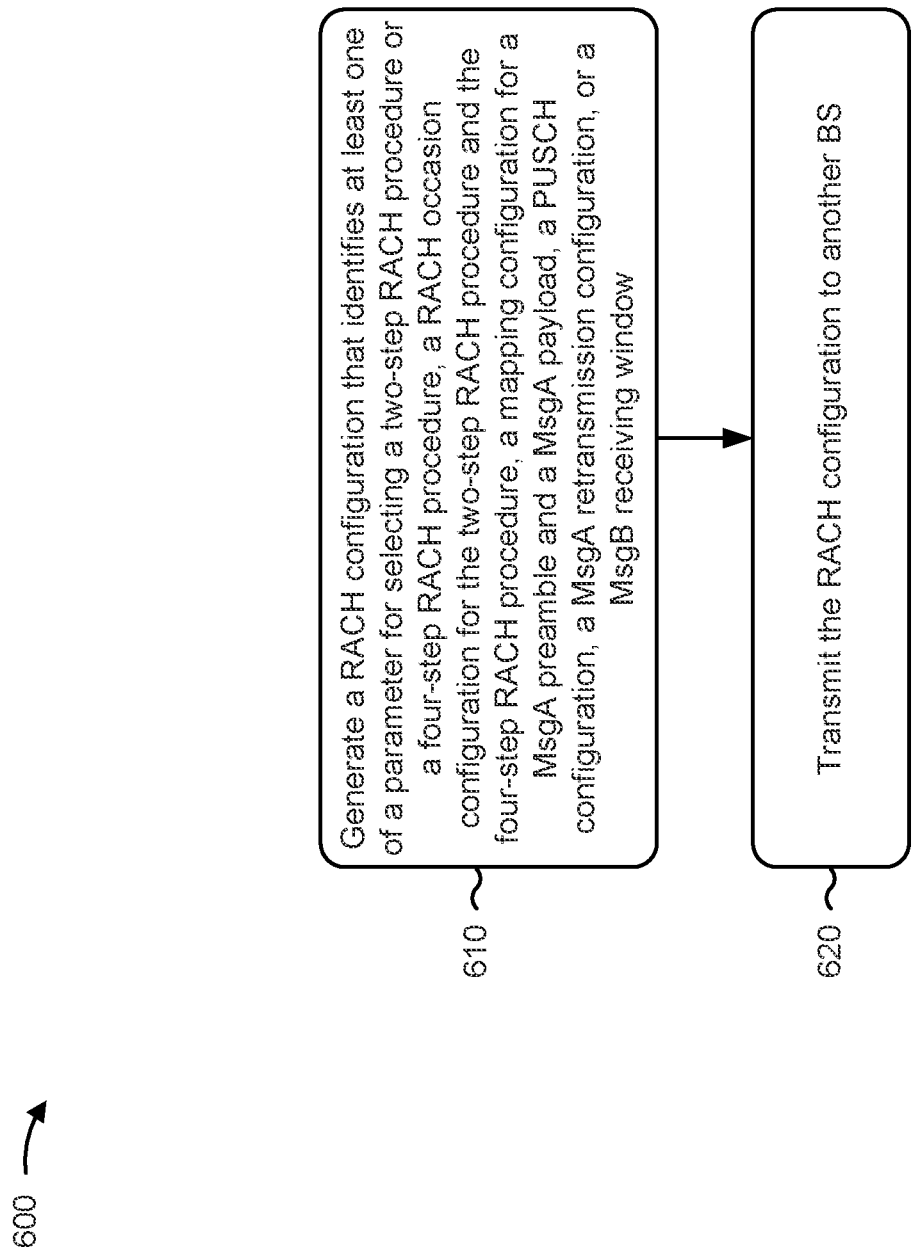
FIG. 6 is a diagram illustrating an example process performed, for example, by a BS, in accordance with various aspects of the present disclosure.

FIG. 6 is a diagram illustrating an example process 600 performed, for example, by a BS, in accordance with various aspects of the present disclosure. Example process 600 is an example where the BS (e.g., BS 110) performs operations associated with two-step RACH signaling.

As shown in FIG. 6, in some aspects, process 600 may include generating a RACH configuration that identifies at least one of a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window (block 610). For example, the BS (e.g., using transmit processor 220, receive processor 238, controller/processor 240, memory 242, and/or the like) may generate a RACH configuration that identifies at least one of a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window, as described above.

As further shown in FIG. 6, in some aspects, process 600 may include transmitting the RACH configuration to a second BS (block 620). For example, the BS (e.g., using transmit processor 220, receive processor 238, controller/processor 240, memory 242, and/or the like) may transmit the RACH configuration to a second BS, as described above.

Process 600 may include additional aspects, such as any single aspect or any combination of aspects described below and/or in connection with one or more other processes described elsewhere herein.

In a first aspect, transmitting the RACH configuration to the second BS comprises transmitting the RACH configuration to the second BS via an Xn interface or an F1 interface. In a second aspect, alone or in combination with the first aspect, the parameter for selecting a two-step RACH procedure or a four-step RACH procedure identifies a beam signal strength threshold for selecting the two-step RACH procedure or the four-step RACH procedure.

In a third aspect, alone or in combination with one or more of the first and second aspects, the parameter for selecting a two-step RACH procedure or a four-step RACH procedure identifies a system information block that identifies whether the two-step RACH procedure or the four-step RACH procedure is to be selected. In a fourth aspect, alone or in combination with one or more of the first through third aspects, the mapping configuration for the MsgA preamble and the MsgA payload identifies a time division multiplexing mapping for the MsgA preamble and the MsgA payload, and the time division multiplexing mapping identifies a time gap between the MsgA preamble and the MsgA payload.

In a fifth aspect, alone or in combination with one or more of the first through fourth aspects, the mapping configuration for the MsgA preamble and the MsgA payload identifies a frequency division multiplexing mapping for the MsgA preamble and the MsgA payload. In a sixth aspect, alone or in combination with one or more of the first through fifth aspects, the mapping configuration for the MsgA preamble and the MsgA payload identifies a PUSCH resource unit for the MsgA preamble.

In a seventh aspect, alone or in combination with one or more of the first through sixth aspects, the PUSCH configuration identifies at least one of a PUSCH modulation coding scheme, a PUSCH transport block size, a PUSCH time-frequency configuration, a PUSCH beam configuration, a PUSCH DMRS sequence, or a PUSCH DMRS port. In an eighth aspect, alone or in combination with one or more of the first through seventh aspects, the MsgA retransmission configuration identifies at least one of a MsgA retransmission timer, or a threshold quantity of MsgA retransmission attempts.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
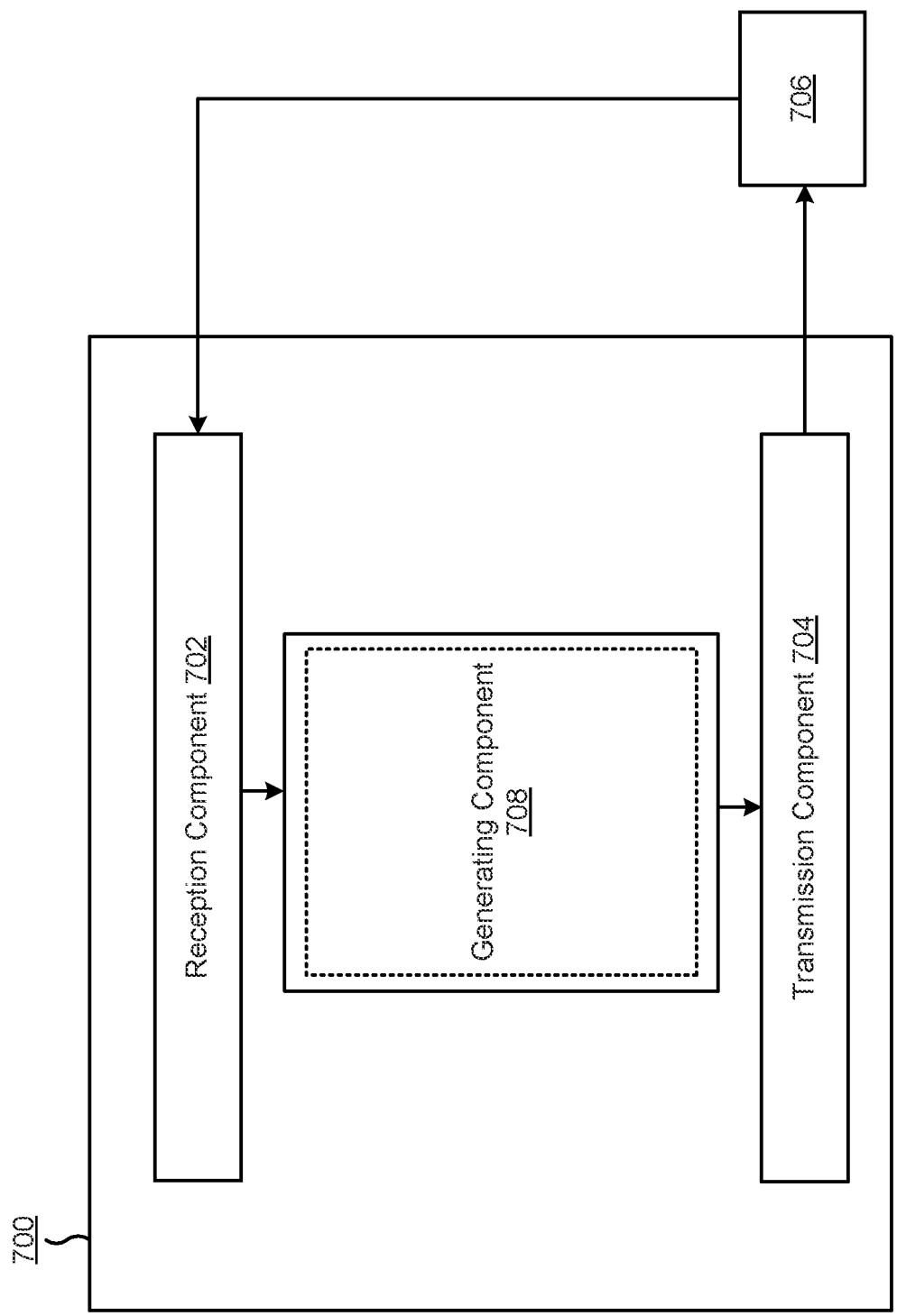
FIGS. 7 and 8 are block diagrams of example apparatuses for wireless communication.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a generating component 708.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The generating component 708 may generate a report for one or more two-step RACH procedures between the apparatus 700 and the apparatus 706. The report may include at least one of an indication of a quantity of MsgA payloads transmitted during the one or more two-step RACH procedures on each beam of one or more beams associated with the apparatus 706, an indication of one or more parameters associated with each MsgA communication transmitted during the one or more two-step RACH procedures, or an indication of whether a respective signal strength for each beam, associated with the one or more two-step RACH procedures, satisfies a signal strength threshold. In some aspects, the generating component 708 may include a receive processor, a transmit processor, a controller/processor, a memory, or a combination thereof, of the UE described above in connection with FIG. 2. The transmission component 704 may transmit the report to the apparatus 706.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
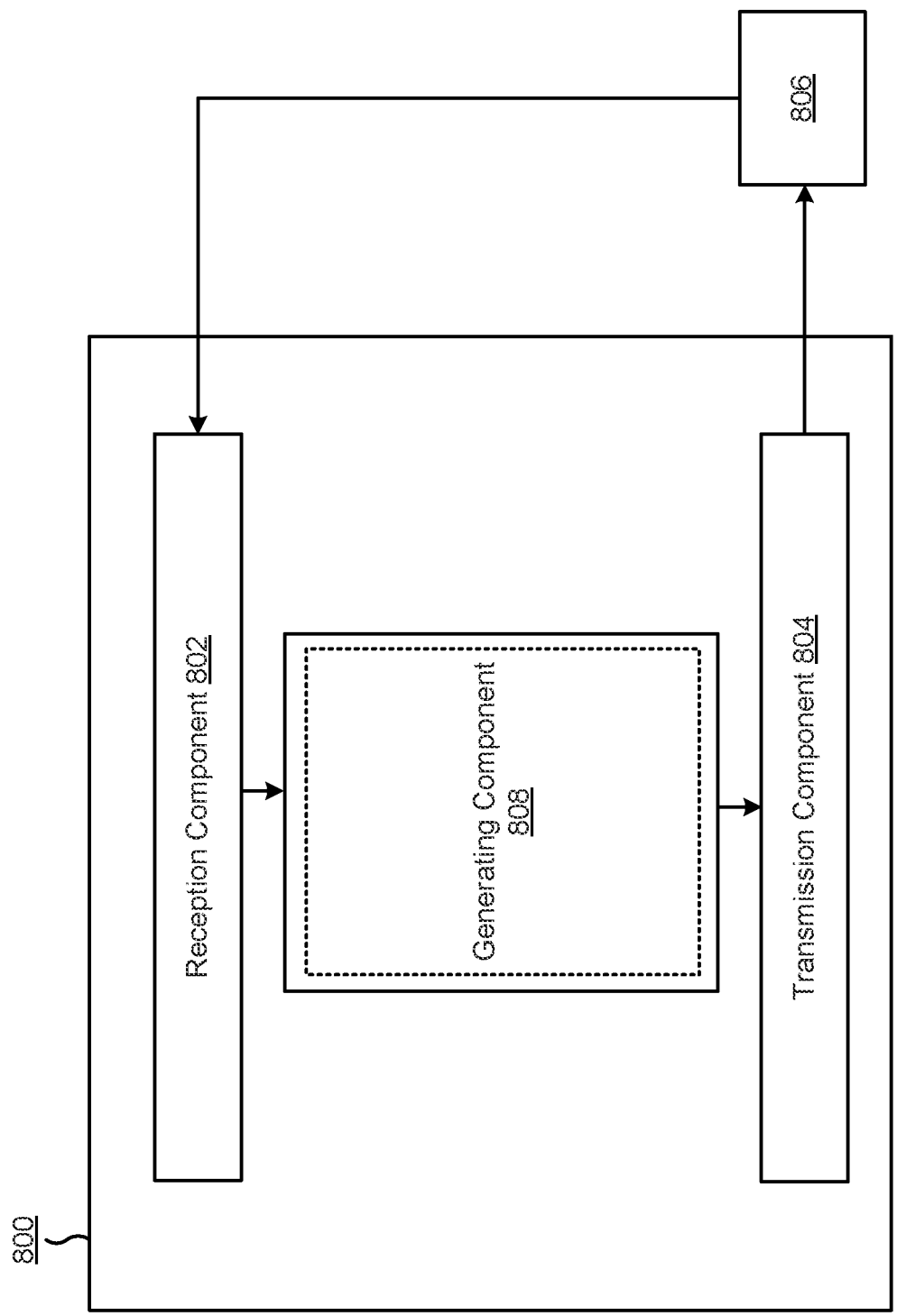

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a generating component 808.

In some aspects, the apparatus 800 may be configured to perform one or more operations described herein in connection with FIGS. 3 and/or 4. Additionally or alternatively, the apparatus 800 may be configured to perform one or more processes described herein, such as process 600 of FIG. 6. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be collocated with the reception component 802 in a transceiver.

The generating component 808 may generate a RACH configuration that identifies at least one of a parameter for selecting a two-step RACH procedure or a four-step RACH procedure, a RACH occasion configuration for the two-step RACH procedure and the four-step RACH procedure, a mapping configuration for a MsgA preamble and a MsgA payload, a PUSCH configuration, a MsgA retransmission configuration, or a MsgB receiving window. In some aspects, the generating component 808 may include a receive processor, a transmit processor, a controller/processor, a memory, or a combination thereof, of the BS described above in connection with FIG. 2. The transmission component 804 may transmit the RACH configuration to the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting one or more two-step random access channel (RACH) procedures based at least in part on a signal strength threshold;
    generating, for the one or more two-step RACH procedures between the UE and a base station (BS), a radio link failure (RLF) report that includes an indication of a set of parameters associated with one or more message A (MsgA) communications transmitted during the one or more two-step RACH procedures, wherein the set of parameters comprise an indication of a quantity of the one or more MsgA communications, an indication of one or more synchronization signal block (SSB) identifiers corresponding to the one or more MsgA communications, and an indication of a satisfaction of the signal strength threshold corresponding to each of the one or more two-step RACH procedures corresponding to the one or more SSB identifiers; and
    transmitting the RLF report to the BS.

2. The method of claim 1,
    wherein the indication of the quantity of MsgA communications is included in a numberOfPreamblesSent information element.

3. The method of claim 1, wherein the set of parameters comprise:
    an indication of a quantity of message 3 (Msg3) fallback communications transmitted during the one or more two-step RACH procedures.

4. The method of claim 1, wherein generating the report for one or more two-step RACH procedures between the UE and the BS comprises:
    generating the report for a plurality of two-step RACH procedures between the UE and the BS.

5. The method of claim 1, wherein the one or more SSB identifiers comprise respective SSB identifiers associated with each beam of one or more beams on which the one or more two-step RACH procedures are performed.

6. The method of claim 1, wherein the indication of the satisfaction of the signal strength threshold indicates that the signal strength threshold is one of satisfied or not satisfied.

7. The method of claim 1, wherein the indication of the satisfaction of the signal strength threshold is indicated per RACH procedure.

8. The method of claim 1, wherein the signal strength threshold comprises a reference signal received power (RSRP) measurement threshold.

9. A user equipment (UE) for wireless communication, comprising:
    one or more memories; and
    one or more processors, coupled to the one or more memories, configured to:
        select one or more two-step random access channel (RACH) procedures based at least in part on a signal strength threshold;
        generate, for the one or more RACH procedures between the UE and a base station (BS), a radio link failure (RLF) report that includes an indication of a set of parameters associated with one or more message A (MsgA) communications transmitted during the one or more two-step RACH procedures, wherein the set of parameters comprise an indication of a quantity of the one or more MsgA communications, an indication of one or more synchronization signal block (SSB) identifiers corresponding to the one or more MsgA communications, and an indication of a satisfaction of the signal strength threshold corresponding to each of the one or more two-step RACH procedures corresponding to the one or more SSB identifiers; and
        transmit the RLF report to the BS.

10. The UE of claim 9, wherein the set of parameters comprise a payload size.

11. The UE of claim 9, wherein the set of parameters comprise a physical uplink shared channel beam.

12. The UE of claim 9, wherein the set of parameters comprise a MsgA communication outcome.

13. The UE of claim 12, wherein the MsgA communication outcome comprises a successful MsgA communication transmission.

14. The UE of claim 12, wherein the MsgA communication outcome comprises a fallback to a message 3 (Msg3) communication.

15. The UE of claim 12, wherein the MsgA communication outcome comprises an indication of a back-off.

16. The UE of claim 15, wherein the report identifies a back-off time duration.

17. A non-transitory computer-readable medium storing a set of instructions for wireless communication, the set of instructions comprising:
    one or more instructions that, when executed by one or more processors of a user equipment (UE), cause the one or more processors to:
        select a plurality of two-step random access channel (RACH) procedures based at least in part on a signal strength threshold;
        generate, for the plurality of two-step RACH procedures between the UE and a base station (BS), a report that includes an indication of whether a respective signal measurement for each beam, associated with the plurality of two-step RACH procedures, satisfies the signal strength threshold, wherein the report comprises an indication of respective synchronization signal block (SSB) identifiers associated with each beam; and
        transmit the report to the BS.

18. The non-transitory computer-readable medium of claim 17, wherein the signal strength threshold comprises a reference signal received power (RSRP) threshold.

19. The non-transitory computer-readable medium of claim 17, wherein the signal strength threshold comprises a reference signal received quality (RSRQ) threshold.

20. The non-transitory computer-readable medium of claim 17, wherein the signal strength threshold comprises a signal to interference plus noise ratio (SINR) threshold.

21. The non-transitory computer-readable medium of claim 17, wherein the report comprises at least one of:
a RACH report,
a radio link failure (RLF) report, or
a connection establishment failure (CEF) report.

22. A first base station (BS) for wireless communication, comprising:
one or more memories; and
one or more processors coupled to the one or more memories, the one or more processors configured to:
determine one or more two-step RACH procedure parameters based at least in part on one or more random access channel (RACH) reports received from one or more user equipments (UEs), the one or more two-step RACH procedure parameters comprising a mapping configuration for a message A (MsgA) preamble and a MsgA payload;
generate a RACH configuration that identifies the one or more two-step RACH procedure parameters; and
transmit the RACH configuration to a second BS.

23. The first BS of claim 22, wherein the one or more processors, when transmitting the RACH configuration to the second BS, are configured to:
transmit the RACH configuration to the second BS via an Xn interface or an F1 interface.

24. The first BS of claim 22, wherein the one or more two-step RACH procedure parameters also comprise at least one of:
a parameter for selecting a two-step RACH procedure or a four-step RACH procedure,
a RACH occasion configuration for the two-step RACH procedure and the four-step RACH procedure,
a physical uplink shared channel (PUSCH) configuration,
a MsgA retransmission configuration, or
a message B (MsgB) receiving window.

25. The first BS of claim 22, wherein the mapping configuration comprises a time gap between the MsgA preamble and the MsgA payload.

26. The first BS of claim 22, wherein the mapping configuration identifies a physical uplink shared channel (PUSCH) resource unit (PRU) for the MsgA preamble.

27. The first BS of claim 22, wherein the mapping configuration identifies a quantity of physical uplink shared channel (PUSCH) resource units (PRUs) for the MsgA preamble.

28. The first BS of claim 24, wherein the MsgA retransmission configuration indicates a MsgA retransmission timer.

29. The first BS of claim 24, wherein the MsgA retransmission configuration indicates a threshold quantity of MsgA retransmission attempts.

30. The first BS of claim 24, wherein the MsgB receiving window comprises a time domain location and a time duration for transmission of a MsgB communication.

* * * * *